US012810892B2

(12) United States Patent
Guo et al.

(10) Patent No.: US 12,810,892 B2
(45) Date of Patent: Nov. 24, 2026

(54) METHODS FOR MANUFACTURING A PARABOLIC SHAPED PLASMONIC WAVEGUIDE BLOCKER

(71) Applicant: Headway Technologies, Inc., Milpitas, CA (US)

(72) Inventors: Hong Guo, Fremont, CA (US); Dayu Zhou, Fremont, CA (US); Tobias Maletzky, San Jose, CA (US); Weihao Xu, San Jose, CA (US); Koji Shimazawa, Cupertino, CA (US); Tsutomu Chou, Chiba (JP)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 19/233,534

(22) Filed: Jun. 10, 2025

(65) Prior Publication Data

US 2025/0372121 A1 Dec. 4, 2025

Related U.S. Application Data

(62) Division of application No. 18/678,681, filed on May 30, 2024, now Pat. No. 12,444,436.

(51) Int. Cl.
*G11B 5/40* (2006.01)
*G11B 5/00* (2006.01)

(52) U.S. Cl.
CPC ........ *G11B 5/40* (2013.01); *G11B 2005/0021* (2013.01)

(58) Field of Classification Search
None
See application file for complete search history.

(56) References Cited

U.S. PATENT DOCUMENTS 9,047,912 B1 * 6/2015 Peng .................... G11B 5/6088
9,659,591 B1 * 5/2017 Peng .................... G11B 5/4866
9,852,752 B1 12/2017 Chou et al.
9,997,178 B1 * 6/2018 Nishimura ........... G11B 5/6088
10,068,596 B2 9/2018 Staffaroni et al.
10,249,333 B2 4/2019 Maletzky et al.
10,262,683 B2 4/2019 Staffaroni et al.
10,403,313 B1 * 9/2019 Gan ....................... G11B 5/314
(Continued)

FOREIGN PATENT DOCUMENTS

JP 2010182394 A 8/2010

OTHER PUBLICATIONS

Notice of Allowance in U.S. Appl. No. 18/678,681, dated Jun. 24, 2025.

(Continued)

*Primary Examiner* — Peter Vincent Agustin
(74) *Attorney, Agent, or Firm* — DLA Piper LLP (US)

(57) ABSTRACT

The present embodiments relate to methods for manufacturing a near-field transducer (NFT) for a hard disk drive write head with a parabolic waveguide blocker. The method can include disposing a metallic layer over a leading shield and a SiO2 layer and disposing a photo-resist over a part of the metallic layer. The method can also include forming the photoresist into a parabolic shape and etching a portion of the metallic layer to form a tapered side of the metallic layer at an angle of around 45 degrees. The method can also include disposing a full film of SiO2 over the metallic layer.

6 Claims, 15 Drawing Sheets

(56) References Cited

U.S. PATENT DOCUMENTS

| | | | | |
|---|---|---|---|---|
| 12,444,436 | B1 * | 10/2025 | Guo | G11B 5/40 |
| 12,456,485 | B1 | 10/2025 | Guo et al. | |
| 2004/0184704 | A1 * | 9/2004 | Bakir | G02B 6/136 385/14 |
| 2017/0092309 | A1 * | 3/2017 | Goulakov | G11B 5/3133 |
| 2017/0125048 | A1 * | 5/2017 | Peng | G11B 5/105 |
| 2018/0096702 | A1 * | 4/2018 | Staffaroni | G11B 5/3906 |
| 2019/0066722 | A1 * | 2/2019 | Maletzky | G11B 5/314 |
| 2019/0206433 | A1 * | 7/2019 | Staffaroni | G11B 5/314 |
| 2025/0372121 | A1 * | 12/2025 | Guo | G11B 5/40 |
| 2026/0038530 | A1 | 2/2026 | Guo et al. | |
| 2026/0065931 | A1 | 3/2026 | Guo et al. | |

OTHER PUBLICATIONS

Office Action in U.S. Appl. No. 18/783,286, dated Mar. 20, 2025.

Notice of Allowance in U.S. Appl. No. 18/783,286, dated Jul. 1, 2025.

Office Action in U.S. Appl. No. 19/354,502, dated Jun. 16, 2026.

Office Action in U.S. Appl. No. 19/359,507, dated Jul. 30, 2026.

* cited by examiner

METHODS FOR MANUFACTURING A PARABOLIC SHAPED PLASMONIC WAVEGUIDE BLOCKER

CROSS REFERENCE TO RELATED APPLICATIONS

This application is a divisional of U.S. application Ser. No. 18/678,681, filed May 30, 2024, now U.S. Pat. No. 12,444,436, the entire disclosure of which is hereby incorporated by reference.

TECHNICAL FIELD

Embodiments of the invention relate to the field of electro-mechanical data storage devices. More particularly, embodiments of the invention relate to a waveguide blocker of a near field transducer that comprises a parabolic shape.

BACKGROUND

A magnetic recording medium (e.g., a magnetic disk) can store magnetic bits representing digital data. A magnetoresistive writer can be part of a hard disk drive (HDD) to write digital data to the magnetic recording medium.

As an overall amount of digital data being stored on HDD devices increases, there is an increasing demand for increased data capacity of HDD devices. One technique to increase data capacity for an HDD can include heat-assisted magnetic recording (HAMR) or microwave-assisted magnetic recording (MAMR). HAMR and MAMR techniques increase the density of HDDs by manipulating a portion of the magnetic recording medium, which can enhance write performance of the write head to the magnetic recording medium.

In HAMR recording head, near field surface plasmon resonance on the NFT can be excited by a waveguide and heats the recording medium. While most of the optical energy is coupled to the NFT, there can be some uncoupled optical energy eventually radiating to the recording media as background. This uncoupled light can degrade the confinement of the thermal spot and further cause reduction of the thermal gradient.

SUMMARY

The present embodiments relate to a near-field transducer (NFT) for a hard disk drive write head with a parabolic waveguide blocker. The waveguide blocker can include a parabolic curved surface in a center portion of a first side of the waveguide blocker and a first side comprising a slope angle of around 45 degrees. The waveguide blocker can be configured to reduce electromagnetic radiation from the waveguide core and recycle a scattering field emitting from the NFT to mitigate a thermal background in a recording medium and improve a thermal gradient to increase an area density capacity (ADC) of the hard disk drive write head.

In a first example embodiment, a near-field transducer (NFT) for a hard disk drive write head is provided. The NFT can include a main pole (MP), a bilayer transducer disposed adjacent to the MP, a waveguide core, and a waveguide blocker disposed adjacent to the waveguide core. The waveguide blocker can include a parabolic shape with a surface configured to be exposed to an ABS surface of the write head. The waveguide blocker can be configured to reduce electromagnetic radiation from the waveguide core and recycle a scattering field emitting from the NFT to mitigate a thermal background in a recording medium and improve a thermal gradient to increase an area density capacity (ADC) of the hard disk drive write head.

In some instances, the waveguide blocker comprises a parabolic curved surface in a center portion of a first side of the waveguide blocker.

In some instances, the curved surface is defined as a function of y=x^2/(4*focal), wherein focal is a focal length of the waveguide blocker.

In some instances, the first side of the waveguide blocker comprises a slope angle WGBa ranges from 10 to 90 degrees.

In some instances, the waveguide blocker at least partially comprises Rhodium, Iridium, Gold, Silver or Ruthenium.

In some instances, the waveguide blocker comprises a Ruthenium layer disposed above both a leading shield layer and a silicon dioxide (SiO2) layer.

In some instances, any of the Ruthenium layer and SiO2 layer is tapered to around 45 degrees as part of an ion beam etching and photoresist masking process.

In some instances, a full film of SiO2 is disposed over the Ruthenium layer.

In some instances, the waveguide core comprises Tantalum Oxide (TaOx) and is disposed on the full film of SiO2 adjacent to the Ruthenium layer.

In another example embodiment, method for manufacturing a waveguide blocker for a near field transducer (NFT) of a write head is provided. The method can include disposing a metallic layer over a leading shield and a SiO2 layer. The method can also include disposing a photo-resist over a part of the metallic layer. The method can also include forming the photoresist into a parabolic shape and etching a portion of the metallic layer to form a tapered side of the metallic layer at an angle of around 10 to 90 degrees. The method can also include disposing a full film of SiO2 over the metallic layer.

In some instances, the method can also include forming a waveguide core adjacent to the full film of SiO2, wherein the waveguide core comprises Tantalum Oxide (TaOx).

In some instances, the method can also include performing a chemical mechanical planarization (CMP) process to planarize the waveguide core to form an even surface on the waveguide core.

In some instances, the metallic layer comprises any of Ruthenium or Rhodium.

In some instances, the waveguide blocker comprises a parabolic shape with a surface configured to be exposed to an ABS surface of the write head, wherein the waveguide blocker is configured to reduce electromagnetic radiation from the waveguide core and recycle a scattering field emitting from the NFT to mitigate a thermal background in a recording medium and improve a thermal gradient to increase an area density capacity (ADC) of the hard disk drive write head.

In some instances, the method can also include disposing a bilayer transducer and a main pole over the waveguide core and/or the waveguide blocker to form the NFT.

In another example embodiment, a waveguide blocker for a write head is provided. The waveguide blocker can include a first side that is tapered at an angle of around 45 degrees. The waveguide blocker can include a parabolic portion disposed in a center of the first side of the waveguide blocker, wherein the waveguide blocker is configured to reduce electromagnetic radiation from a waveguide core and recycle a scattering field emitting from the NFT to mitigate a thermal background in a recording medium and improve a thermal gradient to increase an area density capacity (ADC) of the write head.

In some instances, the parabolic portion has curvature defined as a function of y=x^2/(4*focal), wherein focal is a focal length of the waveguide blocker.

In some instances, the waveguide blocker comprises a Ruthenium layer disposed above both a leading shield layer and a silicon dioxide (SiO2) layer.

In some instances, any of the Ruthenium layer and SiO2 layer is tapered to around 45 degrees as part of an ion beam etching and photoresist masking process.

In some instances, a full film of SiO2 is disposed over the Ruthenium layer.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

A disk drive can include a write head to interact with a magnetic recording medium to read and write digital data to the magnetic recording medium. As the amount of digital data is required to be stored increases and with an increase in data aerial density of hard disk drive (HDD) writing, both the write head and digital data written to the magnetic recording medium can generally be made smaller.

Heat-assisted magnetic recording (HAMR) is a magnetic recording technology that can enable recording at 1~10Tb/inch$^2$ data density. Utilizing the temperature dependence of the coercivity, HAMR can convert optical power into localized heating in a magnetic recording medium to temporarily reduce the switching field needed to align the magnetizations of the medium grains. Sharp thermal gradients which translate into high magnetic gradients can enable a higher data storage density than achievable with the current state-of-the-art magnetic recording technology. Since the heat spot size may be much smaller than the diffraction limit of light, plasmonic structures, also known as near field transducers (NFT), can be used to deliver the desired confinement of the optical heating.

In HAMR recording head, near field surface plasmon resonance on the NFT can be excited by a waveguide and heats the recording medium. While most of the optical energy can be coupled to the NFT, there can also have some uncoupled optical energy eventually radiating to the recording media as background. This uncoupled light can degrade the confinement of the thermal spot and further cause reduction of the thermal gradient.

Further, suppressing the optical background can be used to improve the thermal gradient created by the NFT. While most of the energy inside the waveguide core can be coupled to the NFT, there can also include some uncoupled lights that propagates inside the waveguide. This uncoupled electromagnetic radiation can travel through waveguide and emits in the form of radiative energy which heats the recording medium as a background which coexists with the main heat source generated by the NFT. This background can degrade the overall thermal gradient both along the recording track direction and the cross-track direction. Some designs can include a metallic blocker in front of the waveguide core to suppress this background radiative energy to the medium.

Figure 1:
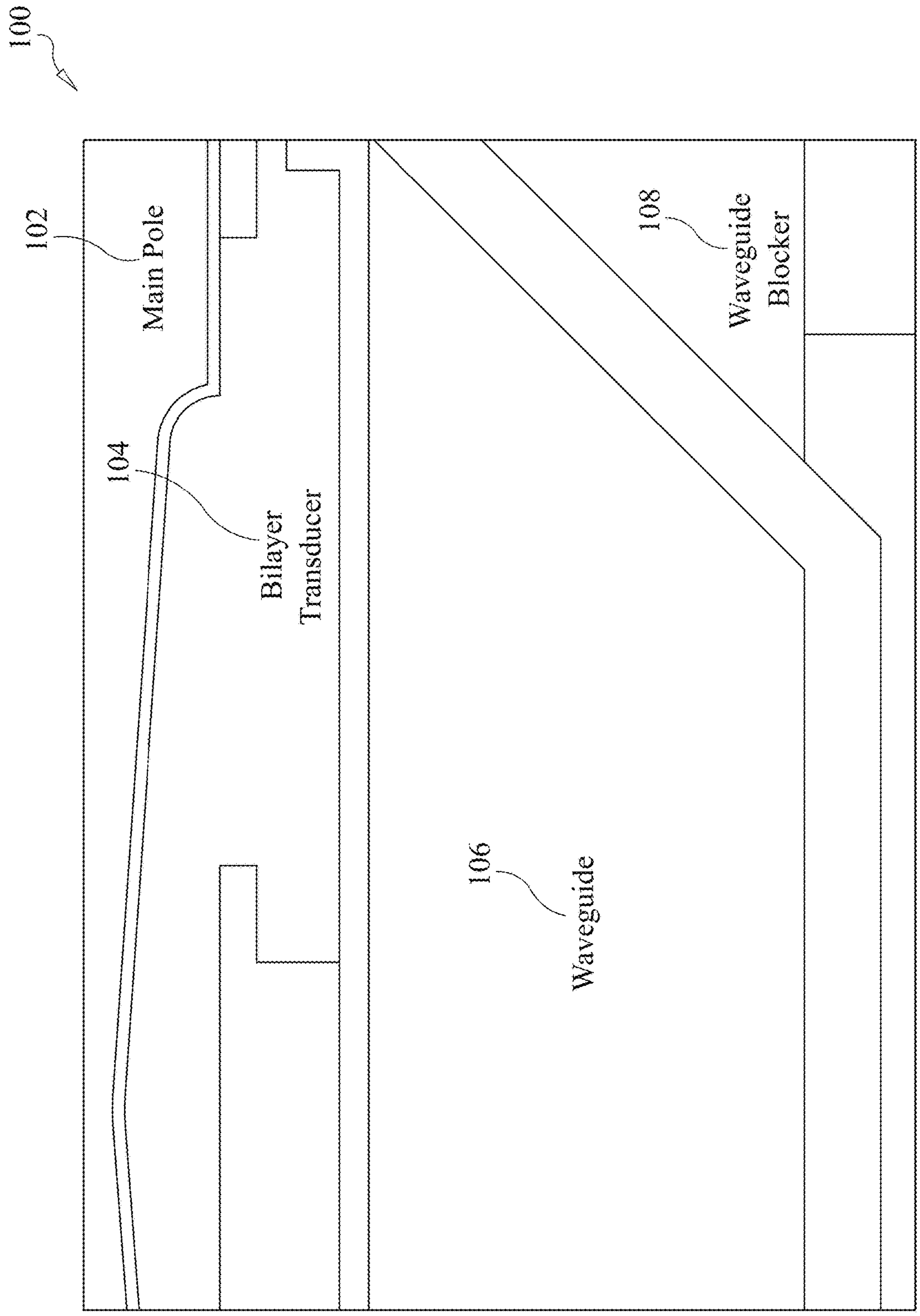
FIG. 1 PRIOR ART
FIG. 1 is a cross section view of a prior art design for a near field transducer according to some embodiments.

FIG. 1 is a cross section view of a prior art design 100. As shown in FIG. 1, the design can include a main pole (MP) 102, a bilayer transducer 104, a waveguide 106, and a waveguide blocker 108. The waveguide blocker 108 can include a triangular prism with slope angle WGBa (204), width at cross track direction of WGBw (204) and a thickness of WGBt (208) in the down track direction, which can be shown in FIG. 2.

The present embodiments generally relate to the use of a parabolic shape for a waveguide to improve a thermal gradient for the HAMR head. The present embodiments relate to a component in the near field transducer (NFT), called parabolic waveguide blocker (PWB). The NFT can be used in a HAMR head, comprising of a first portion (plasmon generator) that can be made of metal bilayer structure (top layer made of highly thermo-mechanically stable materials such as Rhodium (Rh), Iridium (Ir), Platinum (Pt), etc., and Gold (Au) on the bottom layer) which can be on a dielectric waveguide core. In front of the waveguide core, PWB can include a metal structure which is directly exposed to the air bearing surface (ABS), as shown in FIGS. 3A-3B.

Figure 3A:
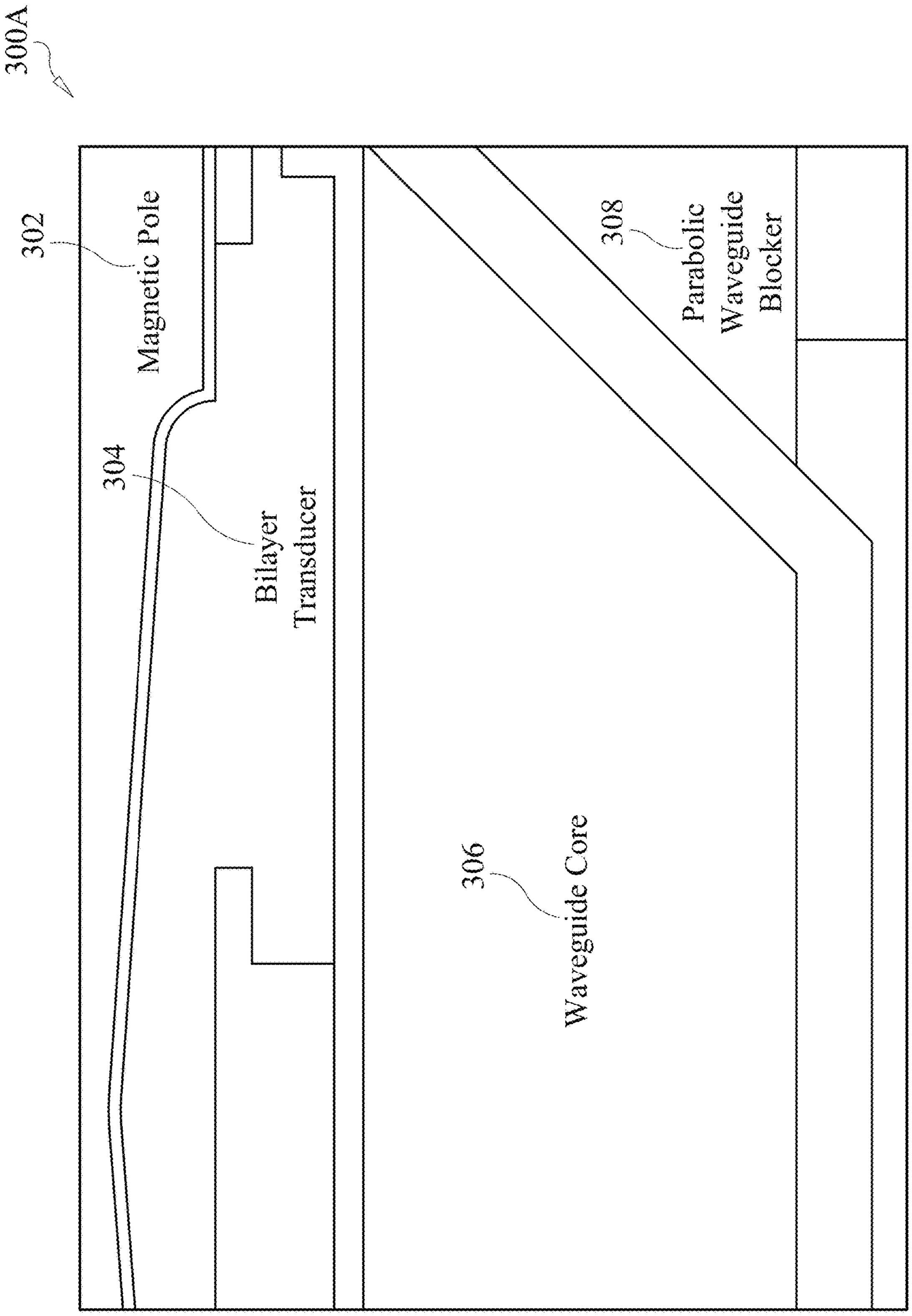
FIGS. 3A-3C illustrate views of the NFT with the parabolic waveguide blocker according to some embodiments.
Figure 3B:
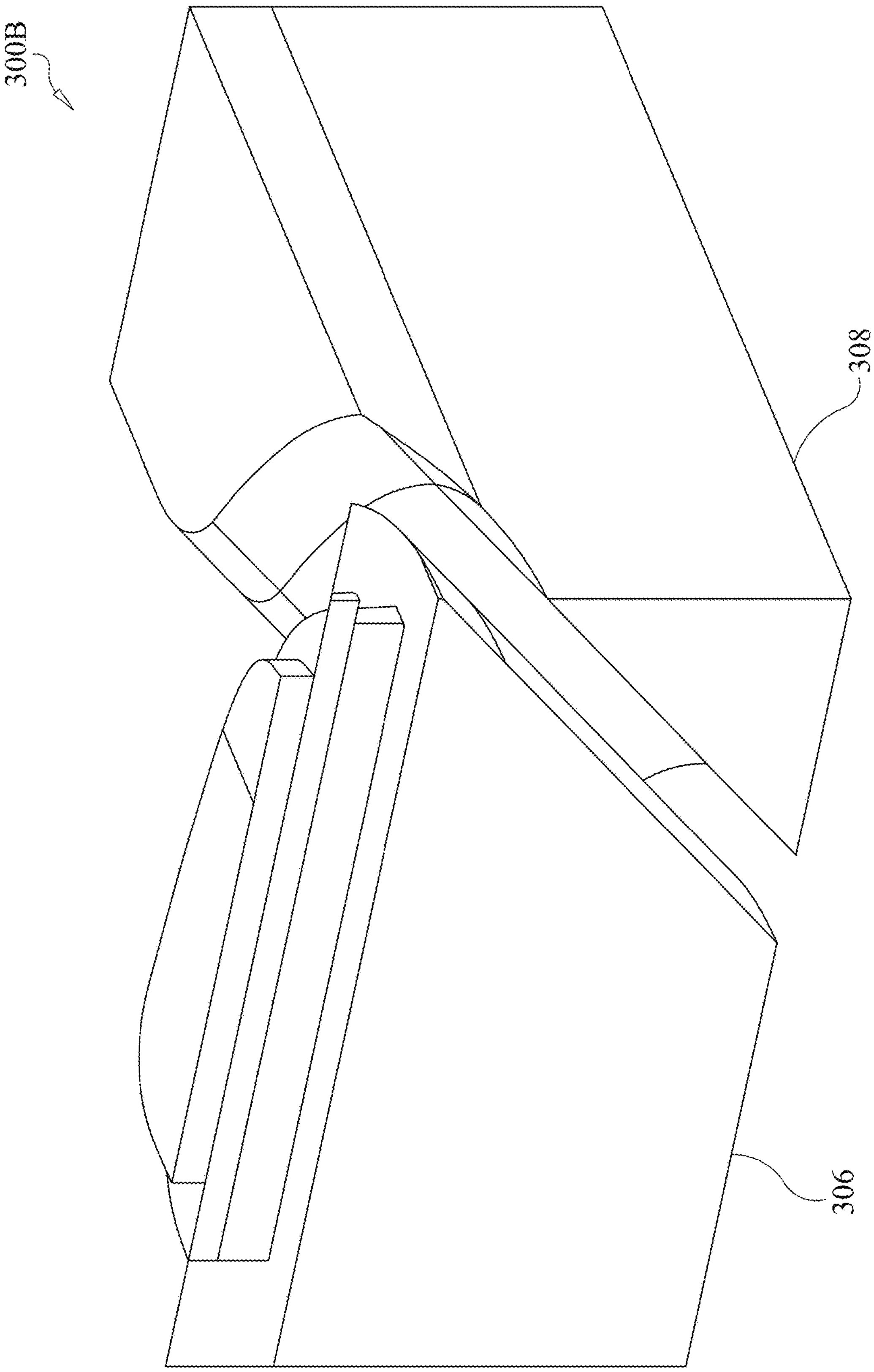
Figure 3C:
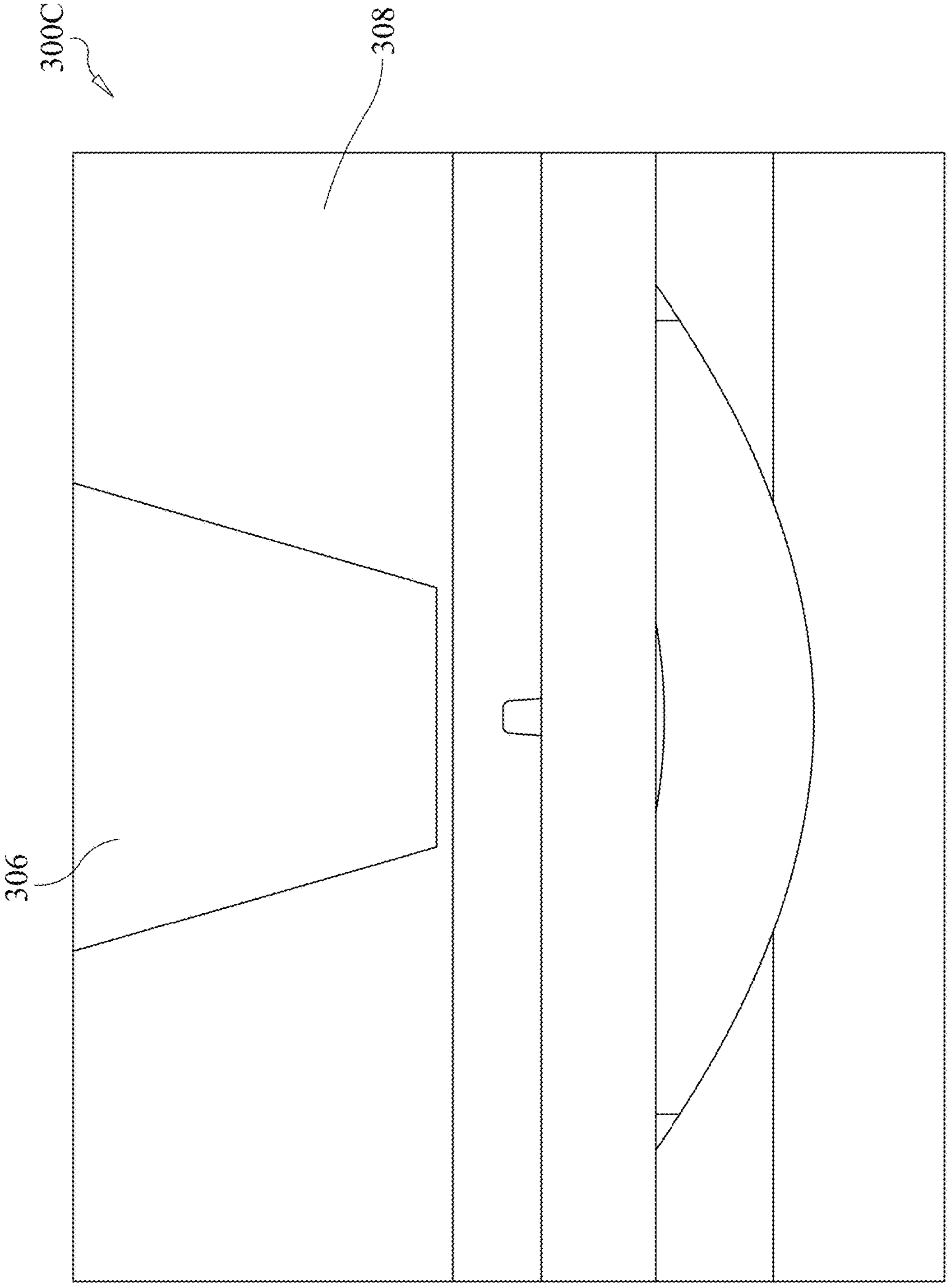

FIGS. 3A-3C illustrate views of the NFT with the parabolic waveguide blocker 300A-C. For example, as shown in FIG. 3A, a device can include a MP 302, bilayer transducer 304, a waveguide core 306, and a parabolic waveguide blocker 308. The present designs can include a new parabolic shape to reduce background EM radiation for improving the thermal gradient in HAMR. The 3D view of the parabolic waveguide blocker (e.g., in FIG. 3B) with a half of the structure shown can illustrate the PEB extending inside the ABS on the side of the waveguide core with the same slope angle WBGa.

In the present structure, the PWB can have a parabolic shaped top view. The parabolic curved surface can be expressed as a function y=x^2/(4*focal) where focal length of parabola is in nm, WGBa is the slope angle can be shown in FIG. 4B. The PWB can reduce the EM radiation from the waveguide and recycles the scattering field from the NFT helping to eliminate the thermal background in the recording medium which improves the thermal gradient on NFT to increase area density capacity (ADC) of HAMR head.

Figure 2:
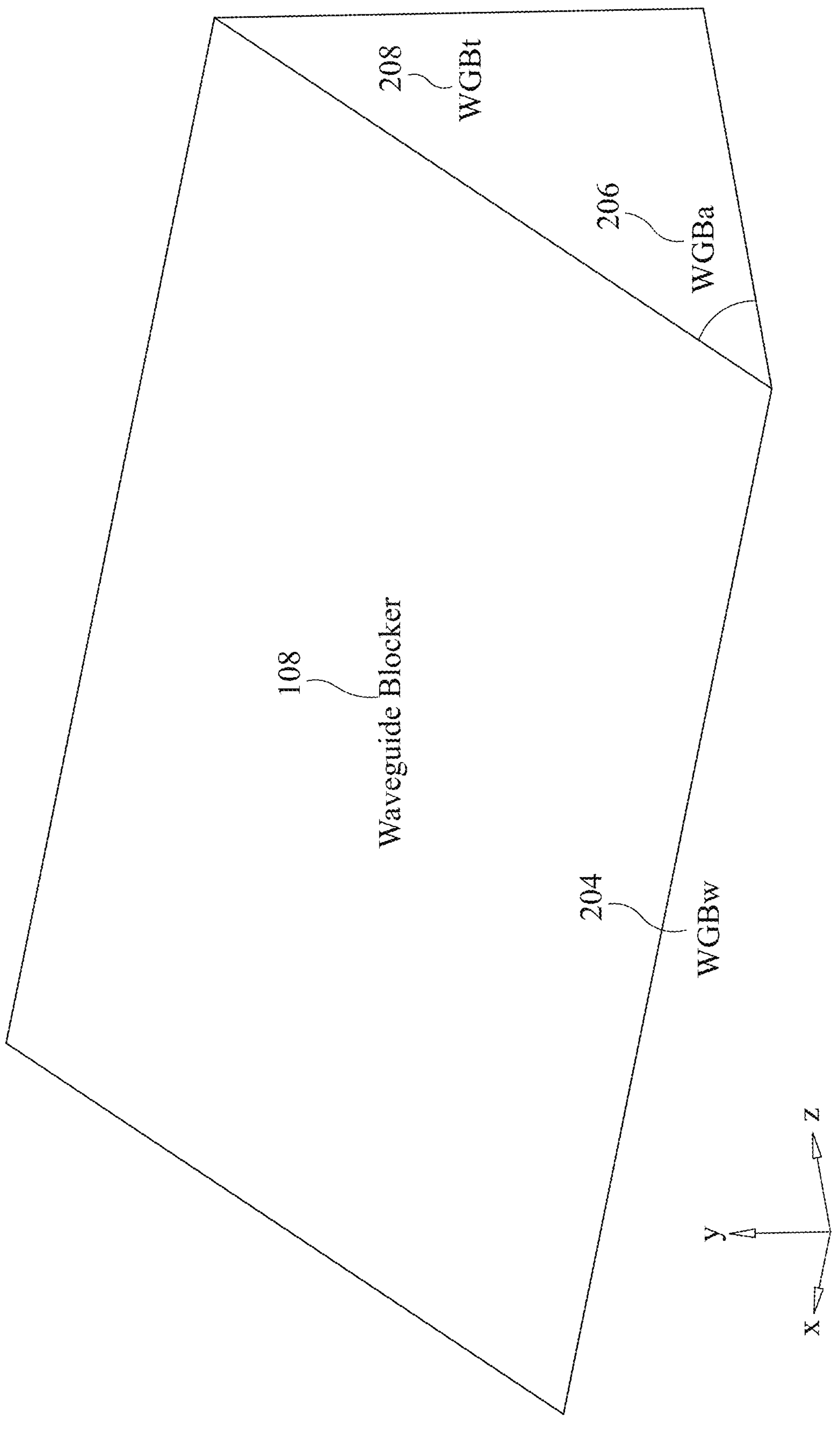
FIG. 2 PRIOR ART
FIG. 2 is a down track view of a prior art design of a waveguide blocker according to some embodiments.

The present designs can use a parabolic shaped waveguide blocker to suppress waveguide background and uses the optical focusing effect of the parabolic surface to re-utilize this uncoupled light back to NFT. The PWB structure can be easily checked by FIB cross-section and air bearing surface (ABS) SEM. Some designs can use a triangular prism shaped waveguide blocker such as is shown in FIG. 2, for example. The designs as described herein can use a parabolic shape as shown in FIG. 4B, for example.

Figure 4A:
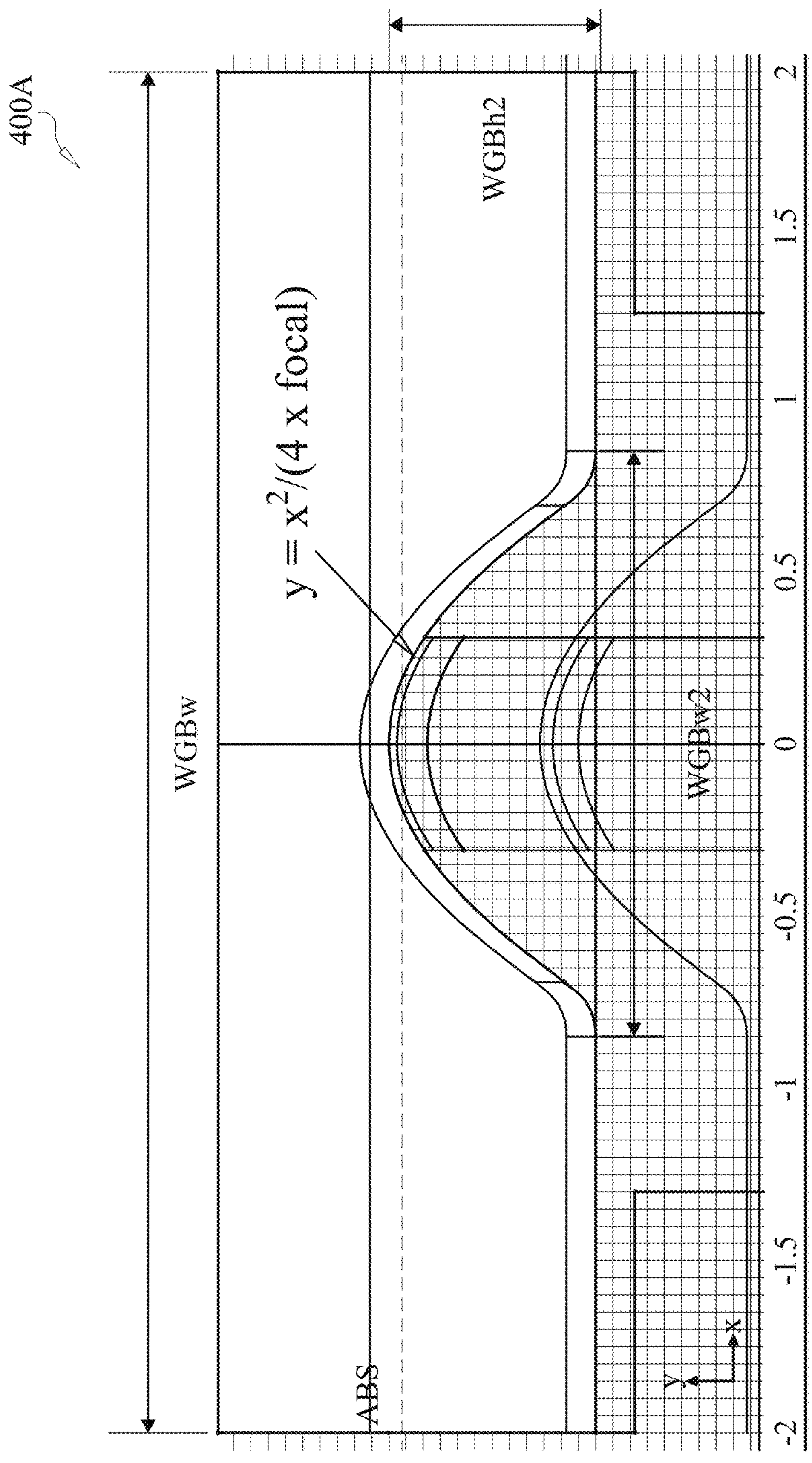
FIGS. 4A-4B illustrate views of an example parabolic waveguide blocker according to some embodiments.
Figure 4B:
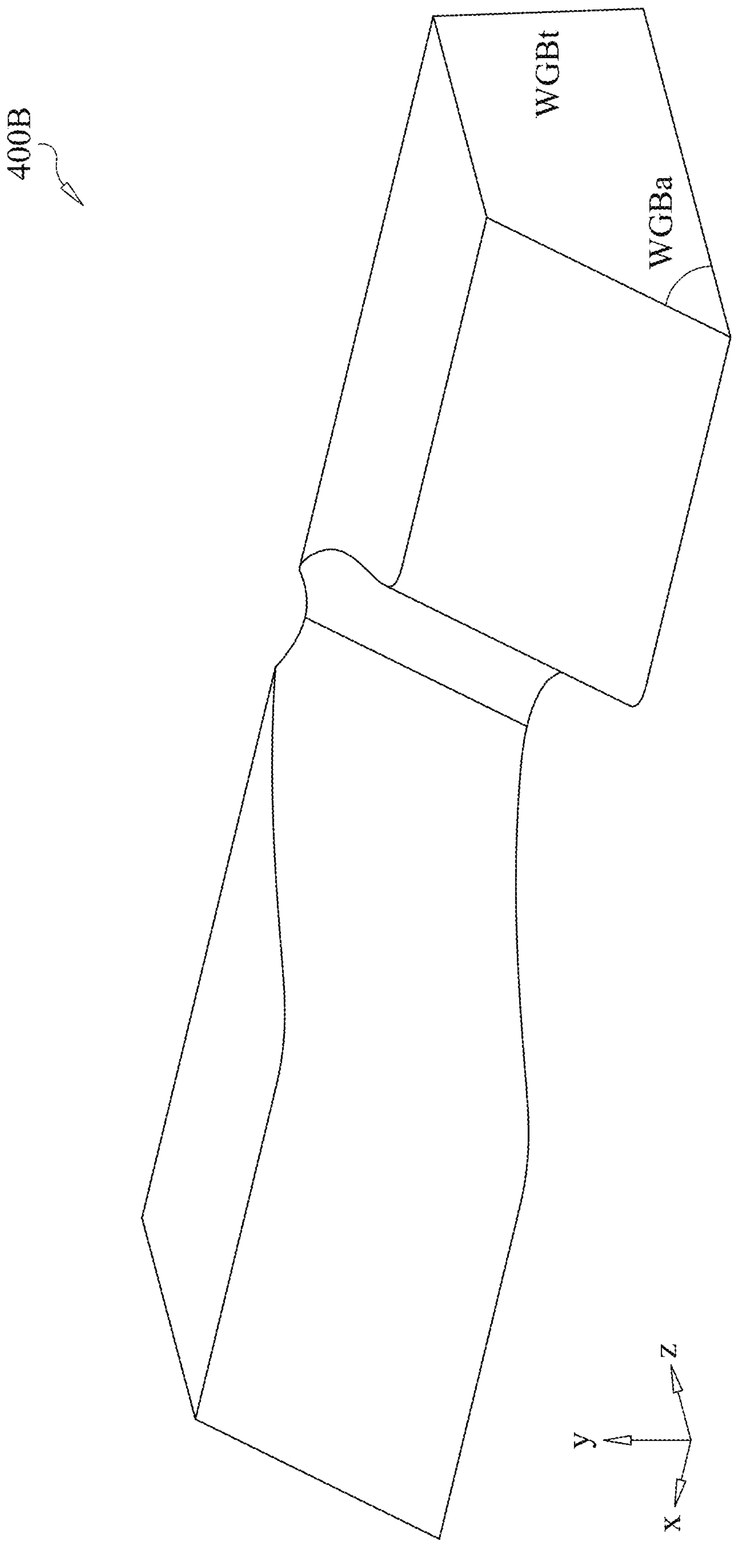
Figure 5A:
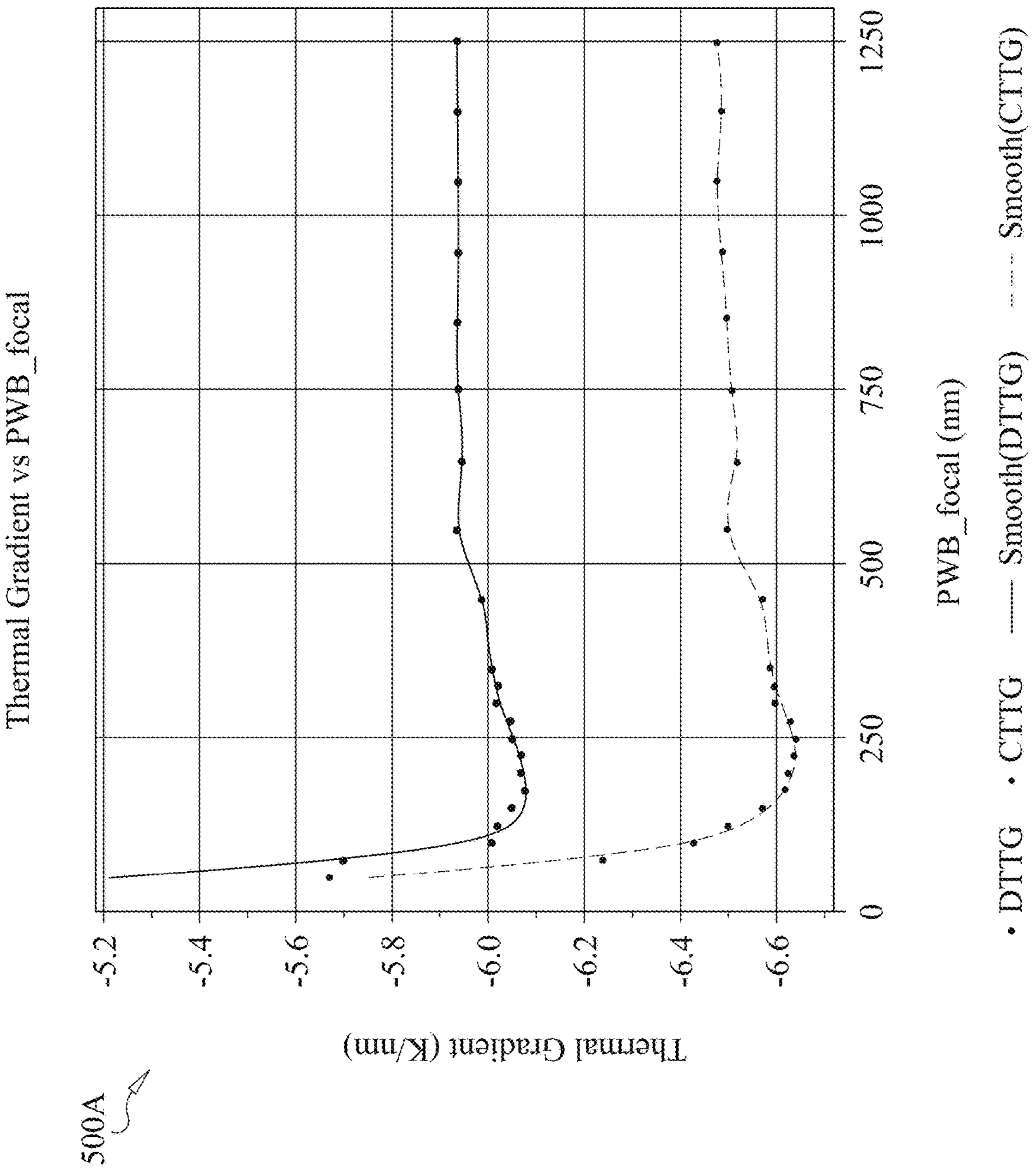
FIGS. 5A-5D illustrate example graphical representations of a parabolic waveguide blocker focal length impact to HAMR head performance according to some embodiments.
Figure 5B:
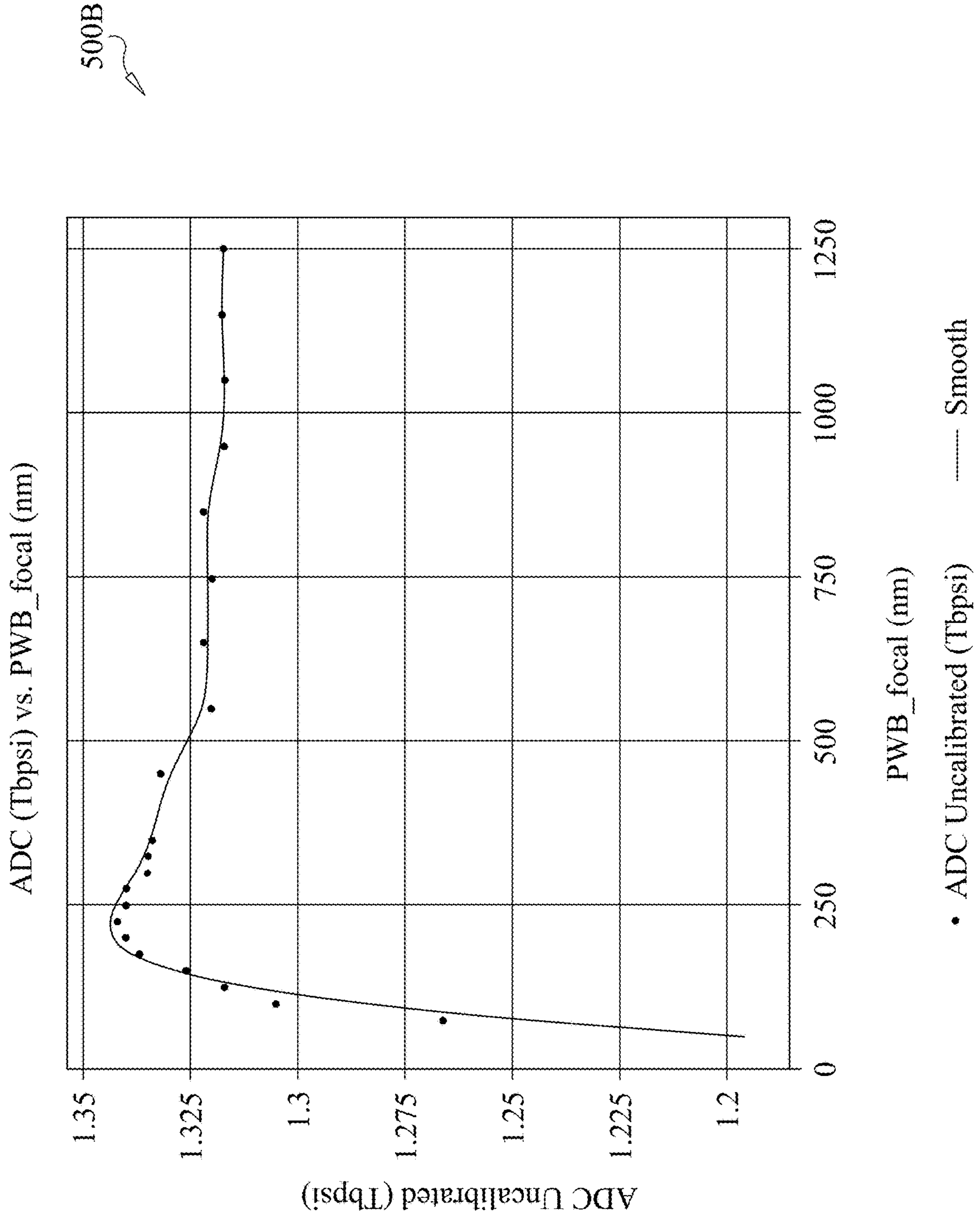
Figure 5C:
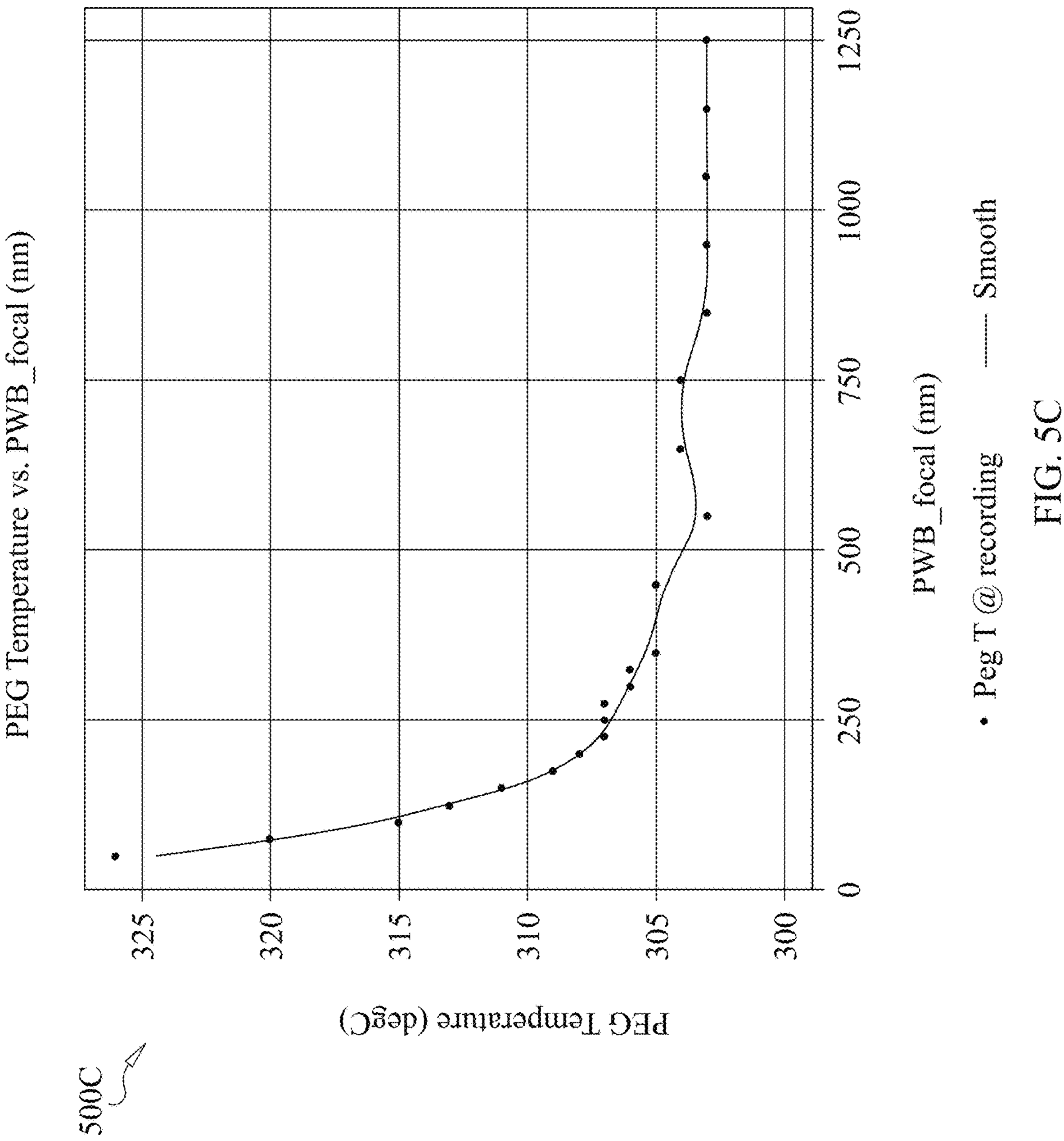
Figure 5D:
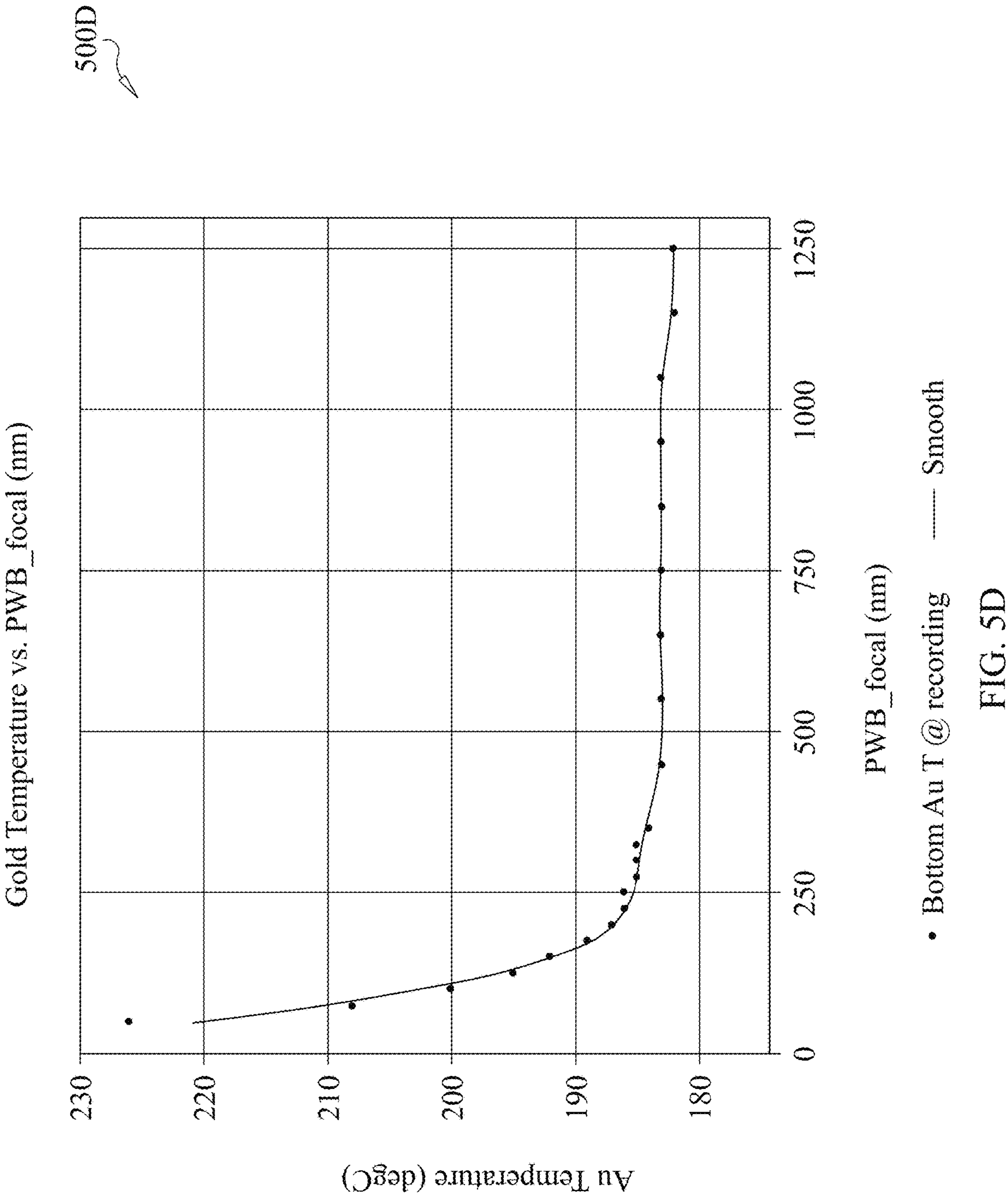

FIGS. 4A-4B illustrate views of an example parabolic waveguide blocker 400A-B. For example, FIG. 4A shows a top view illustrating angles WGBw, WGBh2, and WGBw2 of the parabolic waveguide blocker. Further, in FIG. 4B, a 3D side view of the parabolic waveguide blocker can illustrate angles WGBa and WGBt.

The HAMR NFT structure as described in FIGS. 3A-3B can be different than the other designs (e.g., prior art design in FIG. 1) in that the shape difference on the waveguide blocker shows impact on the HAMR head ADC and reliability performance when the focal length of parabola is tuned.

The structure can have a parabolic shaped waveguide blocker made of highly thermo-mechanically stable material such as Rhodium (Rh), Ruthenium (Ru), etc., that can be in front of the waveguide core near ABS instead of a triangular prism shaped blocker. The parabolic shape can be defined by a focal length PWB_focal, the height of waveguide blocker in ABS direction WGBh2 and the width of waveguide blocker WGBw. From a 3D view, the PWB can have a tapered angle which forms a slope angle on the waveguide blocker defined by WGBa and a thickness of WGBt.

FIGS. 5A-5D illustrate example graphical representations 500A-D of a parabolic waveguide blocker focal length impact to HAMR head performance. FIGS. 5A-5D illustrate example impacts of PWB_focal to the head performance and reliability. FIGS. 5A-5D can show the impact of PWB_focal to the thermal gradient and ADC. A head thermal gradient can be optimized at 225 nm focal length where both down track and cross track gradient are maximized. At the same time, area density capacity can be increased when PWB-_focal increases from 50 nm to 225 nm, then gradually decrease when focal length continues to increase to 1 μm. These results can indicate that the background electromagnetic radiation is controllable by the change of parabolic focal length on the waveguide blocker. The reduced EM background can help to eliminate thermal background in the recording medium therefor thermal gradient is improved.

Figure 6B:
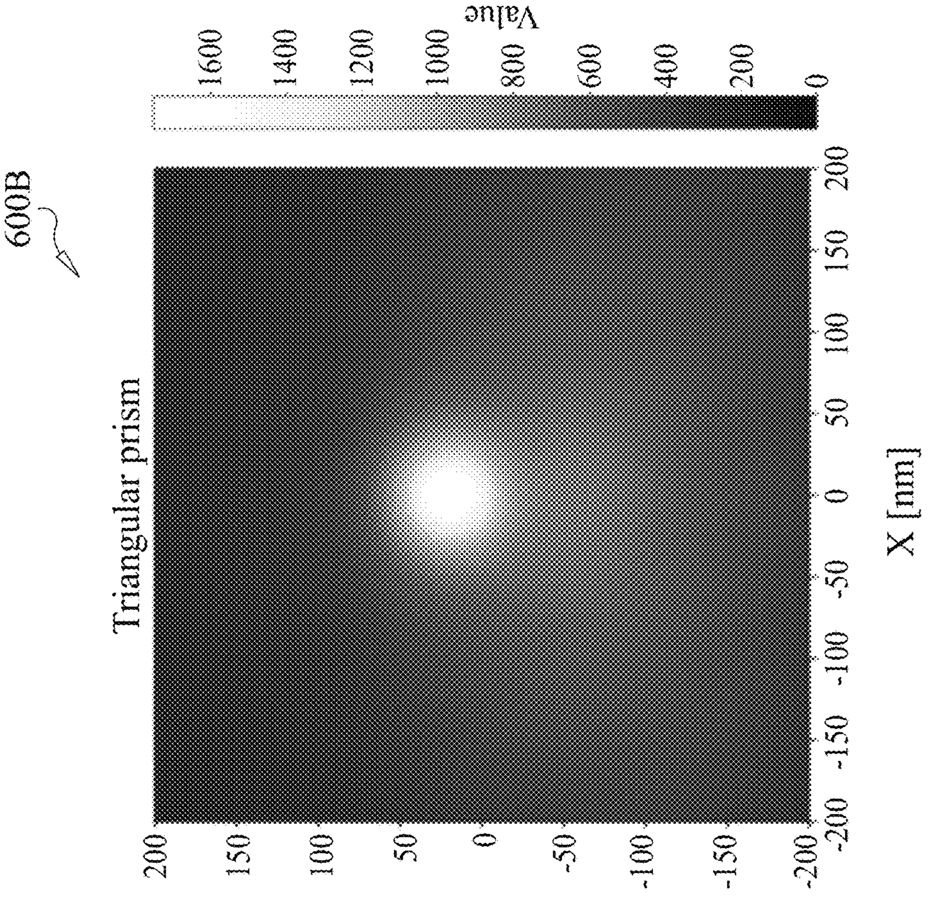
FIGS. 6A-6B illustrates an example thermal distribution in the media generated by NFT with a PWB and a triangular prism according to some embodiments.
Figure 6A:
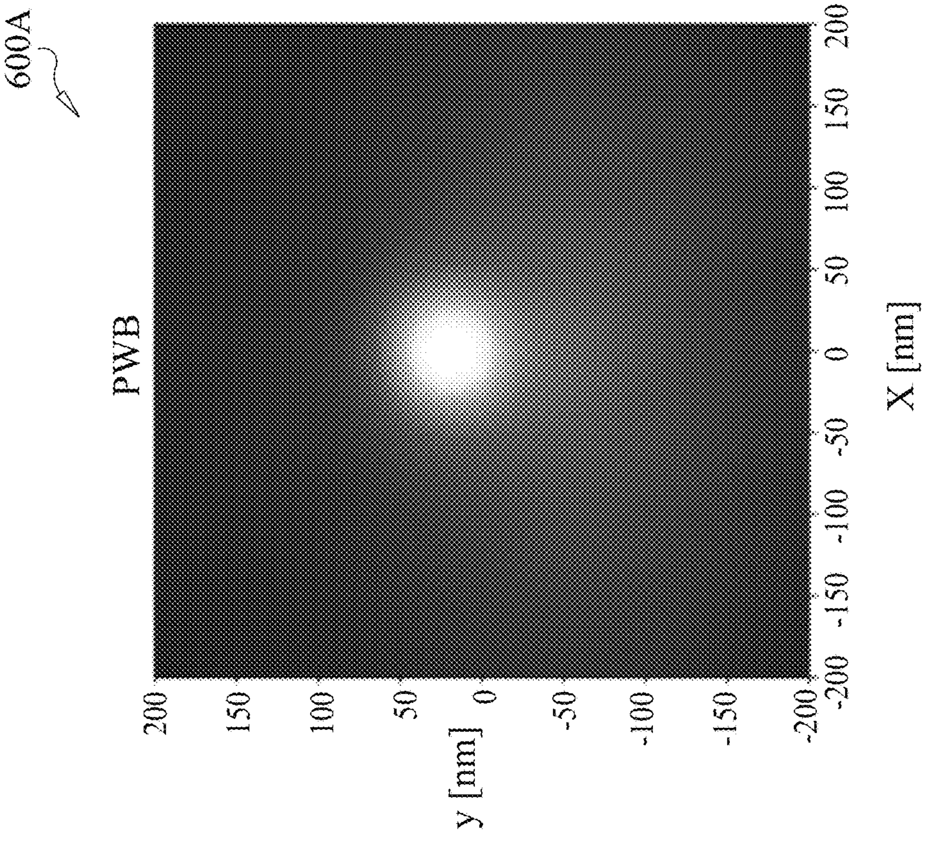

FIGS. 6A-6B illustrates an example thermal distribution 600A-B in the media generated by NFT with a PWB and a triangular prism.

Further, FIGS. 6A-6B can show the impact of changing PWB_focal to the NFT reliability which is represented by the temperature rise on the key component in the NFT. PWB_focal smaller than 225 nm can increase NFT temperature which can degrade the reliability performance.

FIGS. 6A-B can further show the thermal distribution in the recording medium which is generated by the NFT. FIG. 6A shows the thermal spot generated by a NFT with PWB design and FIG. 6B can show the thermal spot generated by the same NFT with triangular prism. Spatial difference of normalized thermal distribution inside recording medium between some designs with a triangular prism shaped waveguide blocker and PWB design shows the effect of thermal background reduction.

Figure 7:
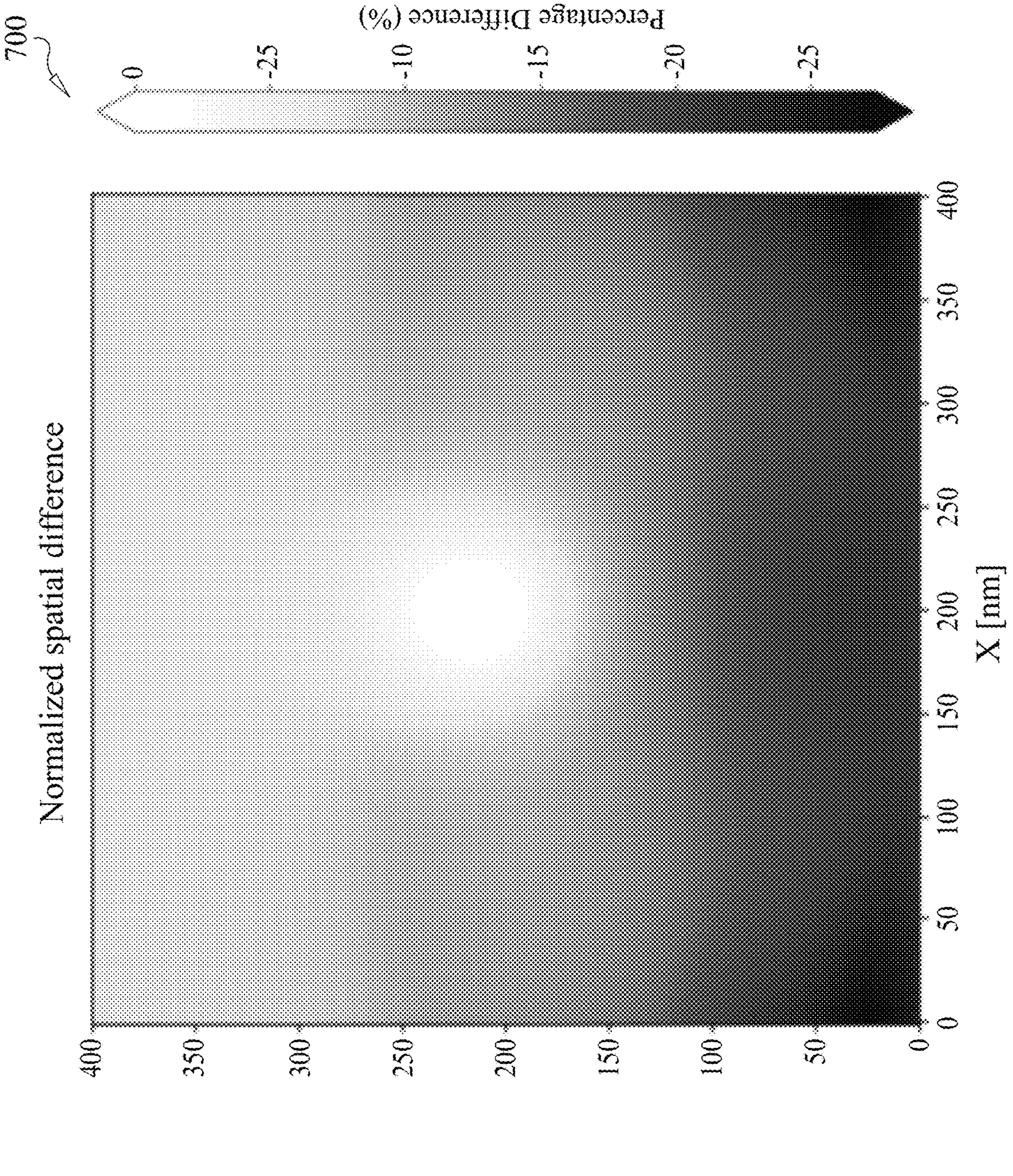
FIG. 7 is a representation of an example thermal distribution spatial difference normalized to peak temperature according to some embodiments.

To reveal the thermal distribution spatial difference, FIG. 7 shows the normalized difference between PWB and triangular prism using triangular prism as reference.

FIG. 7 is a representation of an example thermal distribution spatial difference normalized to peak temperature in the recording layer 700. As shown in FIG. 7, the thermal background can be eliminated in the region surrounding the NFT region. The maximum background reduction can be ~25% near waveguide blocker region and ~10% reduction close to the NFT compared to reference. The reduction of thermal background around the NFT can improve the thermal gradient on the HAMR head.

Figure 8B:
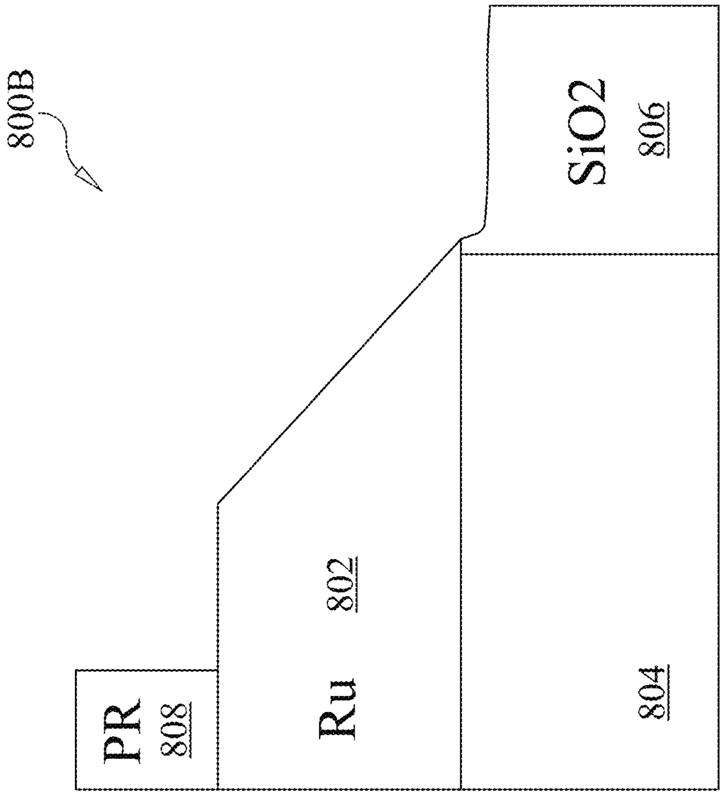
FIGS. 8A-8D illustrate views of an example process for manufacturing a parabolic waveguide blocker as described herein.
Figure 8A:
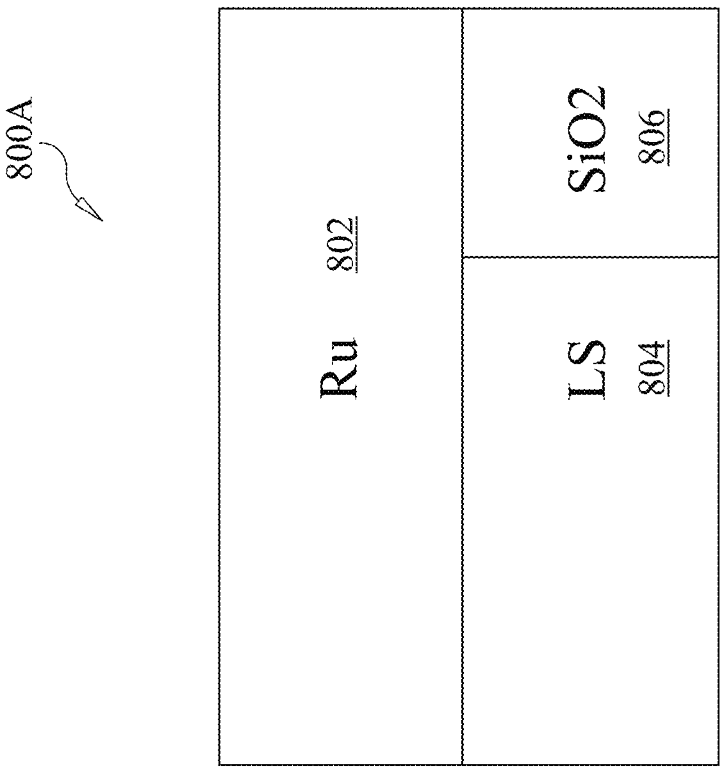
Figure 8D:
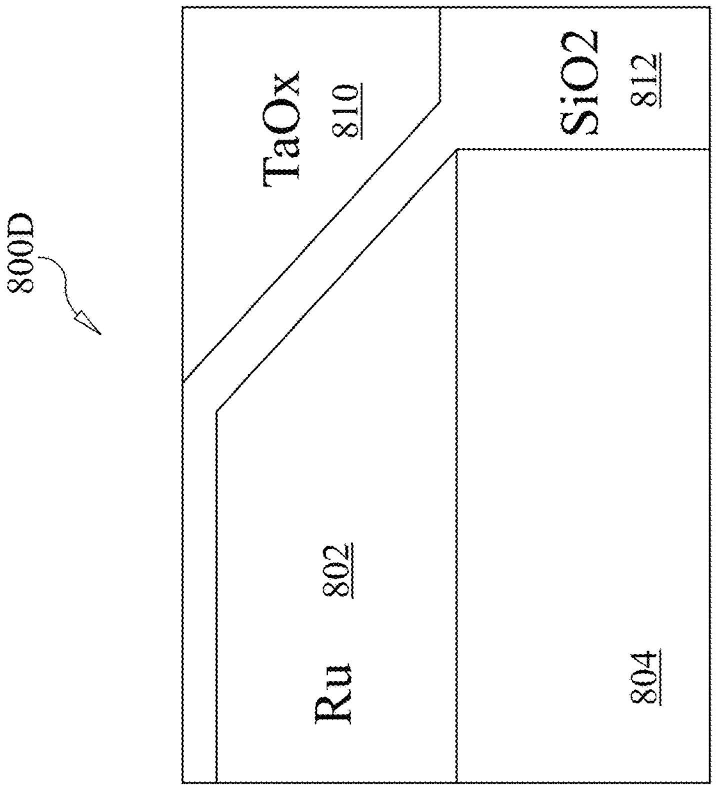

FIGS. 8A-8D illustrate views 800A-D of an example process for manufacturing a parabolic waveguide blocker as described herein. As shown in FIG. 8A, a first view 800A can depict a Ru layer 802 being disposed over a leading shield (LS) 804) and a silicon dioxide ($SiO_2$) layer 806.

Further, in FIG. 8B, a Photo Resist (PR) Coating and Ion Beam Etching (IBE) process can be performed. This can include applying a layer of photoresist (PR) 808 onto the Ru layer 802. The resist 808 can be shaped into a parabolic shape, and then use Ion Beam Etching (IBE) to create a taper feature on the Ru layer 802, LS 804, and/or the SiO2 806 with an approximate taper angle of around 45 degrees.

Figure 8C:
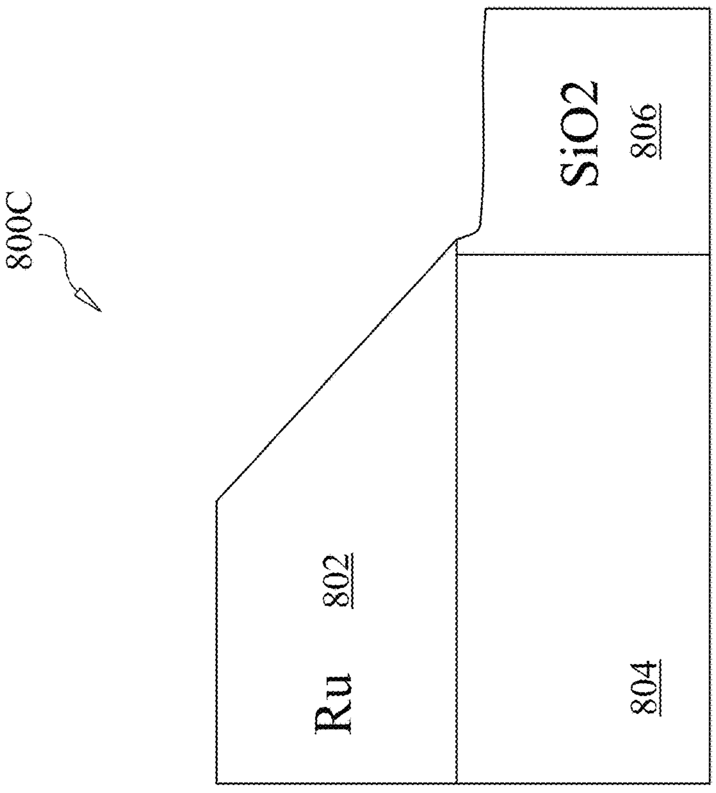

The view 800C in FIG. 8C can show the resist (808) being removed to form the parabolic-shaped waveguide blocker. Further, the view in FIG. 8D can show a Silicon Dioxide (SiO2) and Tantalum Oxide (TaOx) Deposition process. This can include depositing a full film of silicon dioxide (SiO2) 812 followed by the deposition of Tantalum Oxide (TaOx) 810 to serve as the waveguide (WvG) core. In some instances, a Chemical Mechanical Planarization (CMP) can be implemented to planarize the TaOx topography using Chemical Mechanical Planarization (CMP) to ensure a smooth and even surface. A final fabrication step can be performed to fabricate WvG, NFT, and magnetic devices to complete the overall structure.

In a first example embodiment, a near-field transducer (NFT) for a hard disk drive write head is provided. The NFT can include a main pole (MP), a bilayer transducer disposed adjacent to the MP, a waveguide core, and a waveguide blocker disposed adjacent to the waveguide core. The waveguide blocker can include a parabolic shape with a surface configured to be exposed to an ABS surface of the write head. The waveguide blocker can be configured to reduce electromagnetic radiation from the waveguide core and recycle a scattering field emitting from the NFT to mitigate a thermal background in a recording medium and improve a thermal gradient to increase an area density capacity (ADC) of the hard disk drive write head.

In some instances, the waveguide blocker comprises a parabolic curved surface in a center portion of a first side of the waveguide blocker.

In some instances, the curved surface is defined as a function of y=x^2/(4*focal), wherein focal is a focal length of the waveguide blocker.

In some instances, the first side of the waveguide blocker comprises a slope angle WGBa of around 45 degrees.

In some instances, the waveguide blocker at least partially comprises Rhodium or Ruthenium.

In some instances, the waveguide blocker comprises a Ruthenium layer disposed above both a leading shield layer and a silicon dioxide (SiO2) layer.

In some instances, any of the Ruthenium layer and SiO2 layer is tapered to around 45 degrees as part of an ion beam etching and photoresist masking process.

In some instances, a full film of SiO2 is disposed over the Ruthenium layer.

In some instances, the waveguide core comprises Tantalum Oxide (TaOx) and is disposed on the full film of SiO2 adjacent to the Ruthenium layer.

In another example embodiment, method for manufacturing a waveguide blocker for a near field transducer (NFT) of a write head is provided. The method can include disposing a metallic layer over a leading shield and a SiO2 layer. The method can also include disposing a photo-resist over a part of the metallic layer. The method can also include forming the photoresist into a parabolic shape and etching a portion of the metallic layer to form a tapered side of the metallic layer at an angle of around 45 degrees. The method can also include disposing a full film of SiO2 over the metallic layer.

In some instances, the method can also include forming a waveguide core adjacent to the full film of SiO2, wherein the waveguide core comprises Tantalum Oxide (TaOx).

In some instances, the method can also include performing a chemical mechanical planarization (CMP) process to planarize the waveguide core to form an even surface on the waveguide core.

In some instances, the metallic layer comprises any of Ruthenium or Rhodium.

In some instances, the waveguide blocker comprises a parabolic shape with a surface configured to be exposed to an ABS surface of the write head, wherein the waveguide blocker is configured to reduce electromagnetic radiation from the waveguide core and recycle a scattering field emitting from the NFT to mitigate a thermal background in a recording medium and improve a thermal gradient to increase an area density capacity (ADC) of the hard disk drive write head.

In some instances, the method can also include disposing a bilayer transducer and a main pole over the waveguide core and/or the waveguide blocker to form the NFT.

In another example embodiment, a waveguide blocker for a write head is provided. The waveguide blocker can include a first side that is tapered at an angle of around 45 degrees. The waveguide blocker can include a parabolic portion disposed in a center of the first side of the waveguide blocker, wherein the waveguide blocker is configured to reduce electromagnetic radiation from a waveguide core and recycle a scattering field emitting from the NFT to mitigate a thermal background in a recording medium and improve a thermal gradient to increase an area density capacity (ADC) of the write head.

In some instances, the parabolic portion has curvature defined as a function of y=x^2/(4*focal), wherein focal is a focal length of the waveguide blocker.

In some instances, the waveguide blocker comprises a Ruthenium layer disposed above both a leading shield layer and a silicon dioxide (SiO2) layer.

In some instances, any of the Ruthenium layer and SiO2 layer is tapered to around 45 degrees as part of an ion beam etching and photoresist masking process.

In some instances, a full film of SiO2 is disposed over the Ruthenium layer.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A method for manufacturing a waveguide blocker for a near field transducer (NFT) of a write head, the method comprising:

disposing a metallic layer over a leading shield and a SiO2 layer;

disposing a photo-resist over a part of the metallic layer;

forming the photoresist into a parabolic shape and etching a portion of the metallic layer to form a tapered side of the metallic layer at an angle of around 45 degrees; and disposing a full film of SiO2 over the metallic layer.

2. The method of claim 1, further comprising:

forming a waveguide core adjacent to the full film of SiO2 and recessed from an air bearing surface (ABS) of the write head, the recessed distance being defined by a geometry of the parabolic waveguide blocker, wherein the waveguide core comprises Tantalum Oxide (TaOx) and is configured to couple optical energy to the NFT.

3. The method of claim 2, further comprising:

performing a chemical mechanical planarization (CMP) process to remove the Tantalum Oxide from over the parabolic waveguide blocker to form a substantially planar surface aligned with the waveguide blocker.

4. The method of claim 1, wherein the waveguide blocker comprises any of Ruthenium, Iridium, or Rhodium.

5. The method of claim 2, wherein the waveguide blocker comprises a parabolic shape with a surface configured to be exposed to an ABS surface of the write head, wherein the waveguide blocker is configured to reduce electromagnetic radiation from the waveguide core and recycle a scattering field emitting from the NFT to mitigate a thermal background in a recording medium and improve a thermal gradient to increase an area density capacity (ADC) of the write head.

6. The method of claim 2, further comprising:

disposing a bilayer transducer and a main pole over the waveguide core and/or the waveguide blocker to form the NFT.

* * * * *